(12) United States Patent
Kwaske et al.

(10) Patent No.: US 6,273,469 B1
(45) Date of Patent: Aug. 14, 2001

(54) INSERT FOR PROTECTING A VEHICLE OCCUPANT'S HEAD FROM AN IMPACT

(75) Inventors: Phillip E. Kwaske, Bloomfield Hills; Blair E. S. Morrison, Rochester Hills, both of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/366,570

(22) Filed: Sep. 1, 1999

(51) Int. Cl.[7] ................................................... B60R 22/28
(52) U.S. Cl. ......................................... 280/805; 297/472
(58) Field of Search .................................. 280/805, 751; 297/470, 471, 472, 482; 188/371, 372

(56) References Cited

U.S. PATENT DOCUMENTS

| | | | |
|---|---|---|---|
| 3,989,275 | * 11/1976 | Finch et al. | 280/751 |
| 4,955,639 | 9/1990 | Yamamoto . | |
| 5,529,344 | 6/1996 | Yasui et al. . | |
| 5,601,311 | * 2/1997 | Pfeiffer et al. | 280/801.1 |
| 5,685,566 | 11/1997 | Hirase et al. . | |
| 5,716,093 | * 2/1998 | Sadr | 296/146.6 |
| 5,732,974 | 3/1998 | Sayles . | |
| 5,762,371 | 6/1998 | Naguchi . | |
| 5,779,270 | 7/1998 | Tanaka . | |
| 5,820,164 | 10/1998 | Patel et al. . | |
| 5,826,907 | * 10/1998 | Saito et al. | 280/808 |
| 5,863,071 | 1/1999 | Li-Calso . | |
| 6,007,100 | * 12/1999 | Steffens, Jr. | 280/801.1 |
| 6,050,631 | * 4/2000 | Suzuki et al. | 296/189 |
| 6,106,012 | * 8/2000 | Boegge et al. | 280/801.1 |

* cited by examiner

*Primary Examiner*—Paul N. Dickson
(74) *Attorney, Agent, or Firm*—Tarolli, Sundheim, Covell, Tummino & Szabo L.L.P.

(57) ABSTRACT

An assembly (10) for use in a vehicle (16) includes a webbing guide (30) for guiding movement of seat belt webbing (14) in the vehicle (16), a fastener (70), a resilient cover (80), and an energy absorbing structure (100). The fastener (70) mounts the webbing guide (30) in position in the vehicle (16) and includes a head portion (76) and a longitudinal axis (75). The resilient cover (80) includes a cover portion (82) covering the head portion (76) of the fastener (70) and at least a portion of the webbing guide (30). The energy absorbing structure (100) is insertable between the webbing guide (30) and the resilient cover (80). The energy absorbing structure (100) is a part separate from the resilient cover (80) and has ribs (110, 120) that deform to absorb energy from an impact to an outer surface portion (96) of the resilient cover (80). Preferably, the energy absorbing structure (100) includes multiple ribs (110, 120) that intersect each other and extend transversely to each other. The part includes a surface (109) for connecting the part to the cover (80).

21 Claims, 3 Drawing Sheets

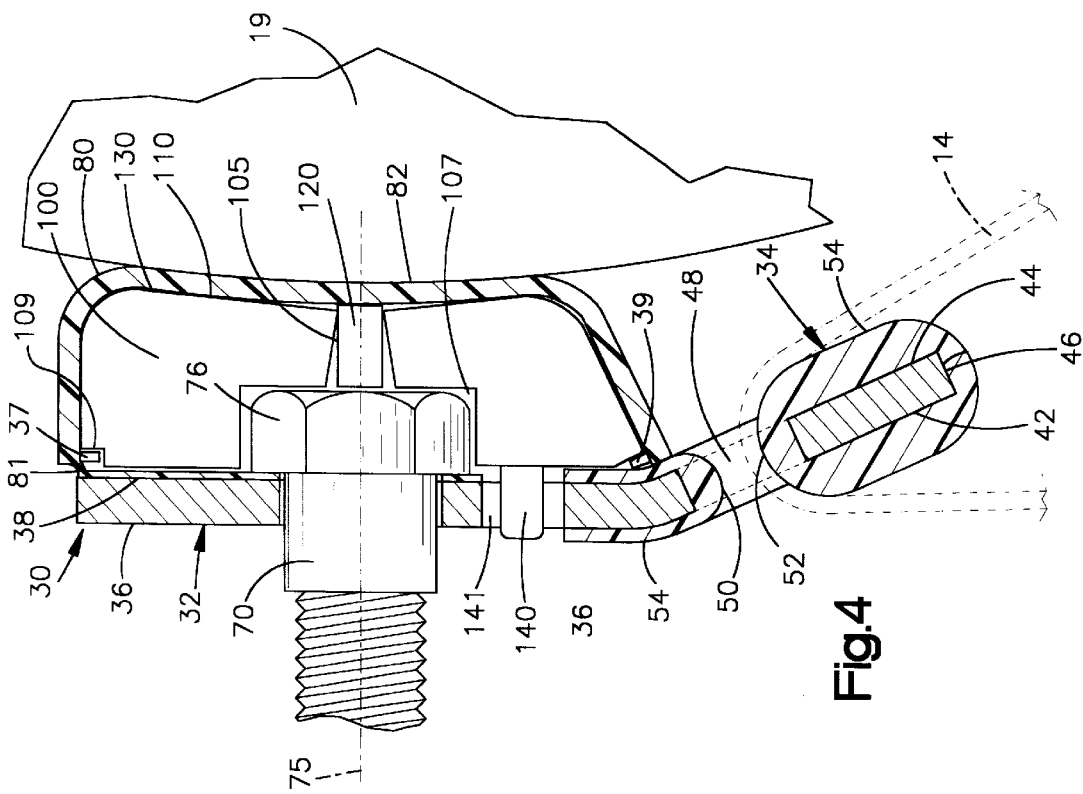
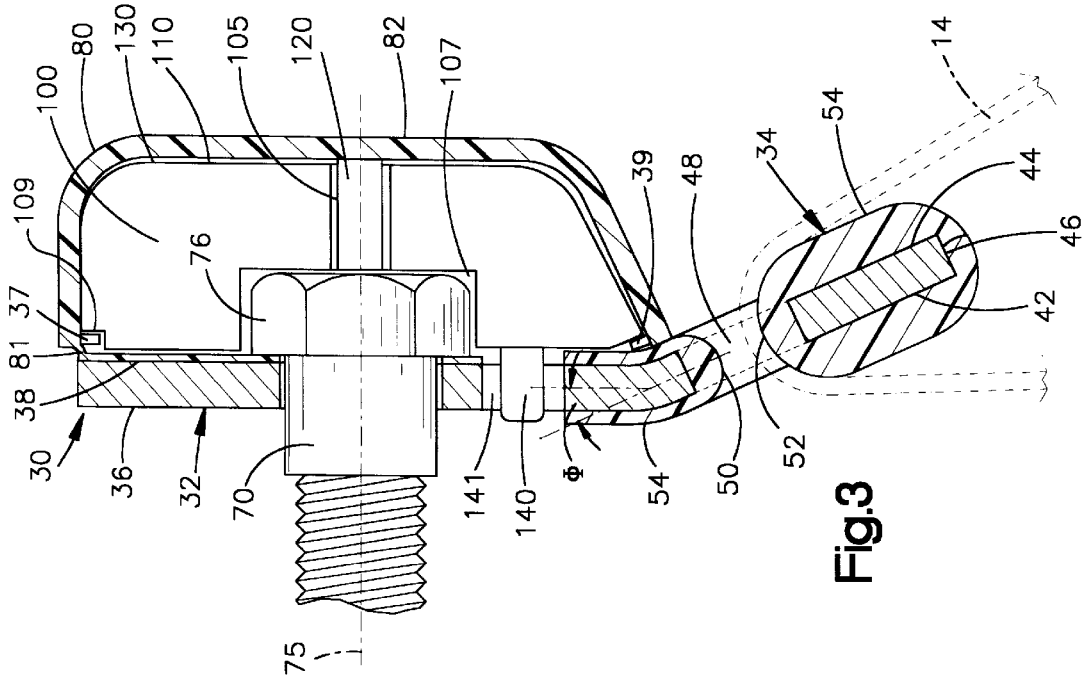

INSERT FOR PROTECTING A VEHICLE OCCUPANT'S HEAD FROM AN IMPACT

FIELD OF THE INVENTION

The present invention relates to an assembly for use in a vehicle which comprises a webbing guide for guiding movement of seat belt webbing, a fastener for mounting the webbing guide in a vehicle, and a cover member for covering the webbing guide and the fastener.

BACKGROUND OF THE INVENTION

A typical vehicle seat belt system includes a length of belt webbing which is extensible about a vehicle occupant in a vehicle seat to restrain the occupant. Intermediate its ends, the belt webbing passes through a webbing guide, sometimes referred to as a D-ring, which is part of a webbing guide assembly mounted in the vehicle adjacent the vehicle seat. In the event of a collision, particularly a side impact collision, the head of the occupant can forcibly strike the webbing guide assembly.

The United States Department of Transportation Federal Motor Vehicle Safety Standard No. 201 requires such a webbing guide assembly to have a Head Impact Criterion (referred to as HIC(d)) value of under 1000 determined in accordance with Standard No. 201 (1996).

SUMMARY OF THE INVENTION

In accordance with the present invention, an assembly for use in a vehicle comprises a webbing guide for guiding movement of seat belt webbing in the vehicle, a fastener, a resilient cover, and an energy absorbing structure. The fastener mounts the webbing guide in position in the vehicle and includes a head portion and a longitudinal axis. The resilient cover includes a cover portion covering the head portion of the fastener and at least a portion of the webbing guide. The energy absorbing structure is insertable between the webbing guide and the resilient cover. The energy absorbing structure is a part separate from the resilient cover and has ribs which deform to absorb energy from an impact to an outer surface of the resilient cover. The ribs intersect each other and extend transversely to each other. The part includes a surface for connecting the part to the cover.

BRIEF DESCRIPTION OF THE DRAWINGS

The foregoing and other features of the present invention will become apparent to one skilled in the art upon reading the following description of the present invention with reference to the accompanying drawings, wherein:

FIG. 3 is a sectional view of a portion of the assembly shown in FIG. 1;

FIG. 4 is view similar to FIG. 3 showing parts in different positions;

DESCRIPTION OF A PREFERRED EMBODIMENT

Figure 1:
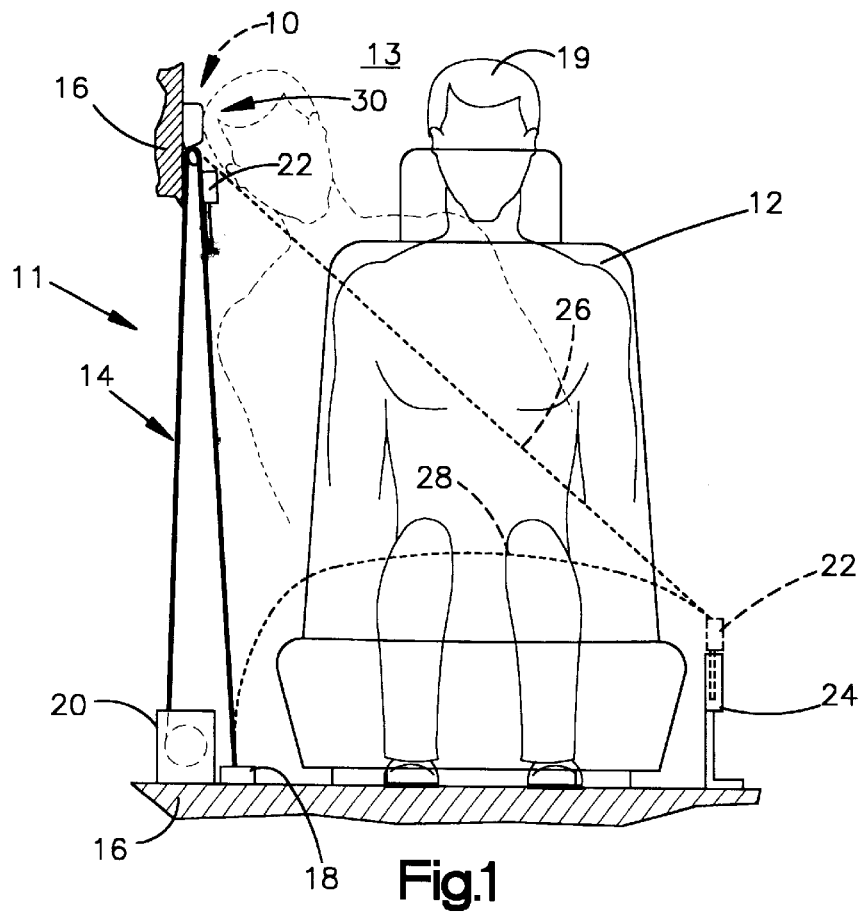
FIG. 1 is a schematic illustration of a vehicle seat belt system including an assembly for protecting a vehicle occupant's head in accordance with the present invention.

The present invention relates to an assembly for helping to protect the head of an occupant of a vehicle from a forcible impact against a seat belt webbing guide that is mounted in a passenger compartment of the vehicle. The present invention is applicable to various seat belt system configurations. As representative of the present invention, FIG. 1 illustrates an assembly 10 for helping to protect a vehicle occupant's head 19. The assembly 10 is incorporated in a three-point continuous loop seat belt system 11 for use in restraining a vehicle occupant.

During operation of the vehicle, an occupant of the vehicle sits on a seat 12 in a passenger compartment 13 of the vehicle. A length of seat belt webbing 14 is extensible about the vehicle occupant. One end of the length of belt webbing 14 is anchored to the vehicle body 16 at an anchor point 18 located on one side of the seat 12. The opposite end of the belt webbing 14 is attached to a seat belt webbing retractor 20 which is secured to the vehicle body 16 on the same side of the seat 12. Intermediate its ends, the belt webbing 14 passes through a tongue assembly 22 and a webbing guide 30 that is located above the retractor 20 and the anchor point 18. When the seat belt system 11 is not in use, the belt webbing 14 is wound on the retractor 20 and is oriented generally vertically on the one side of the seat 12, as shown in solid lines in FIG. 1.

To engage the seat belt system 11, the tongue assembly 22 is manually grasped and is pulled across the lap and torso of the occupant sitting in the seat 12. As the tongue assembly 22 is pulled across the lap and torso of the occupant, the tongue assembly 22 moves along the belt webbing 14, and the belt webbing 14 is unwound from the retractor 20. When the belt webbing 14 has been pulled across the lap and torso of the occupant, the tongue assembly 22 is connected with a buckle 24, as shown in dashed lines in FIG. 1. The buckle 24 is connected to the vehicle body 16 and is disposed on the side of the seat 12 opposite the anchor point 18. When the seat belt system 11 is thus buckled, the length of belt webbing 14 is divided by the tongue assembly 22 into a torso portion 26 that extends across the torso of the occupant and a lap portion 28 that extends across the lap of the occupant.

Figure 2:
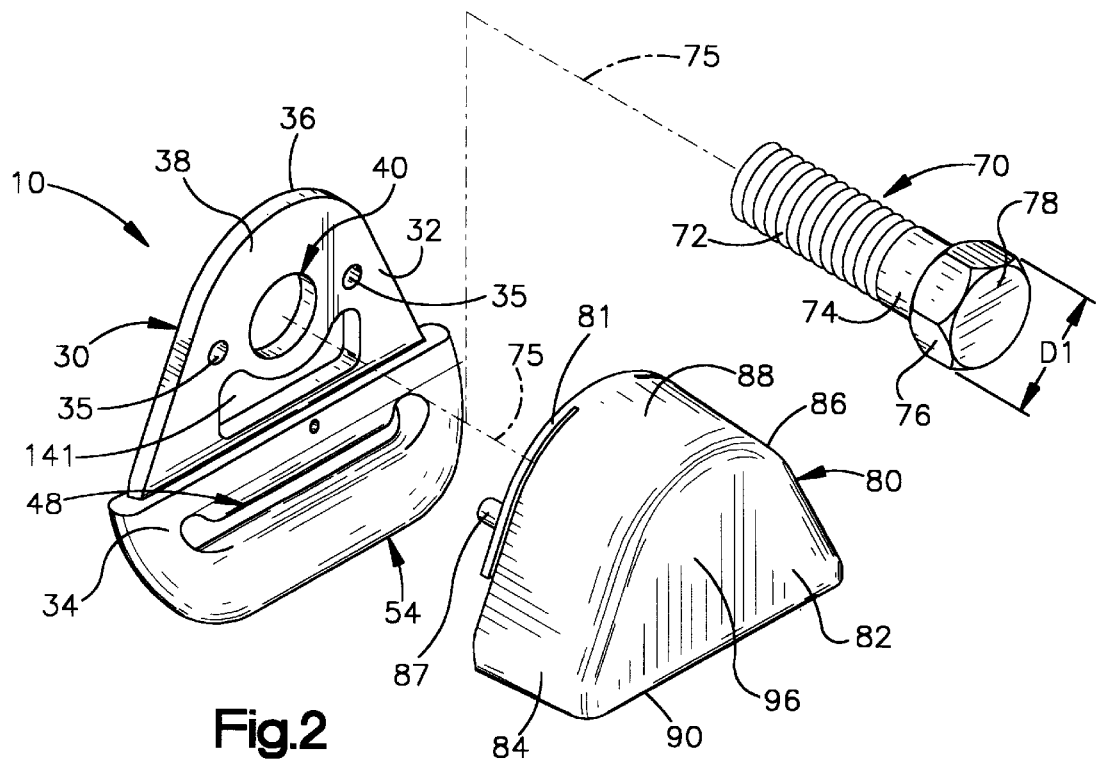
FIG. 2 is an exploded perspective view of parts of the vehicle seat belt system shown in FIG. 1.

The webbing guide 30 (FIG. 2) is preferably made from metal and is substantially triangular in shape. The webbing guide 30 includes a planar body section 32 and a guide section 34 which extends from the body section 32 at an angle Φ (FIG. 3) relative to the body section. The body section 32 has parallel first and second side surfaces 36 and 38. A mounting hole 40 is located in the body section 32 of the webbing guide 30 and is centered on an axis 75 as shown in FIG. 2.

The guide section 34 of the webbing guide 30 has parallel first and second side surfaces 42 and 44 (FIG. 3) which merge with the first and second side surfaces 36 and 38, respectively, of the body section 32. The guide section 34 has a lower edge surface 46 which comprises the base of the triangular-shaped webbing guide 30. An elongate slot 48 (FIGS. 2 and 3) extends through the guide section 34.

The webbing guide 30 further includes a webbing engagement cap 54. The webbing engagement cap 54 is preferably made from a plastic material with a low coefficient of friction and is bonded to the guide section 34 of the webbing guide 30 in a manner known in the art, such as by insert molding. The webbing engagement cap 54 covers portions of both the first and second surfaces 42 and 44 of the guide section 34. The edges of the elongate slot 48 are defined by an upper slot surface 50 and a lower slot surface 52 of the webbing engagement cap 54.

A mounting bolt 70 for fastening the assembly 10 to the vehicle body 16 and mounting the webbing guide 30 has a threaded portion 72, a shank portion 74, a longitudinal axis corresponding with axis 75 of the hole 40, and a head 76. The dimensions of the threaded portion 72 and the shank portion 74 are selected so that the threaded portion and the shank portion extend freely through the mounting hole 40 in the body section 32 of the webbing guide 30. The head 76 of the mounting bolt 70 has a minimum diameter D1 (FIG. 2) which is greater than the diameter of the mounting hole 40 in the webbing guide 30. The head 76 of the mounting bolt 70 includes an end surface 78.

The assembly 10 includes a resilient cover 80. The cover 80 (FIG. 2) is substantially triangular in shape and is approximately the same size as the body section 32 of the webbing guide 30. The cover 80 is one piece and made of a homogeneous plastic material, preferably polypropylene.

Figure 5:
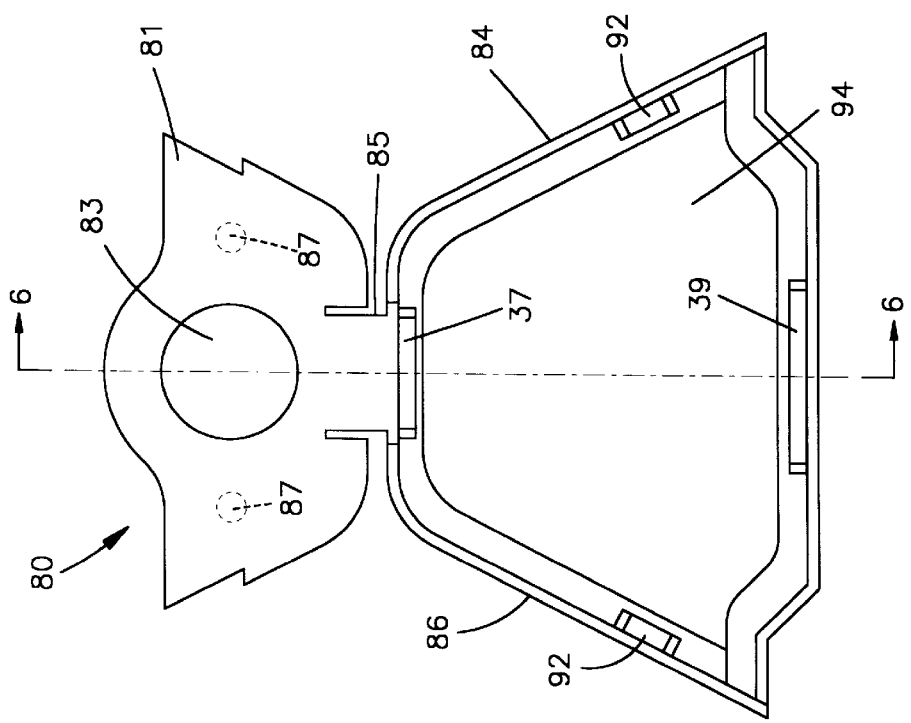
FIG. 5 is a detail view of a part of the assembly shown in FIG. 2.

The cover 80 includes a face portion 82 (FIG. 2), first and second lateral side wall portions 84 and 86 (FIG. 5), upper and lower side wall portions 88 and 90 (FIG. 3), and peripheral lips 92 (FIG. 5). The face portion 82 has an inner surface 94 and an outer surface 96 that faces the passenger compartment 13. The first and second lateral side wall portions 84 and 86 and the upper and lower side wall portions 88 and 90 together form a side wall that extends between the face portion 82 of the cover 80 and the peripheral lips 92.

The cover 80 further includes a closure wall 81 with a central opening 83 which is adapted to receive the fastener 70 (FIG. 5). The closure wall 81 is hinged to the upper margin of the cover 80 by means of a plastic hinge 85 that forms a part of the unitary molding comprising the cover 80. The closure wall 81 further includes two studs 87 for insertion into two corresponding holes 35 (FIG. 2) in the webbing guide 30 for securing the cover 80 to the webbing guide 30.

The peripheral lips 92 of the cover 80 extend radially inward from the first and second lateral side wall portions 84 and 86. The peripheral lips 92 extend over peripheral edges of the webbing guide 30 and engage the first surface 36 of the body section 32. The peripheral lips 92 provide the cover 80 with a snap-fit connection to the webbing guide 30.

Figure 7:
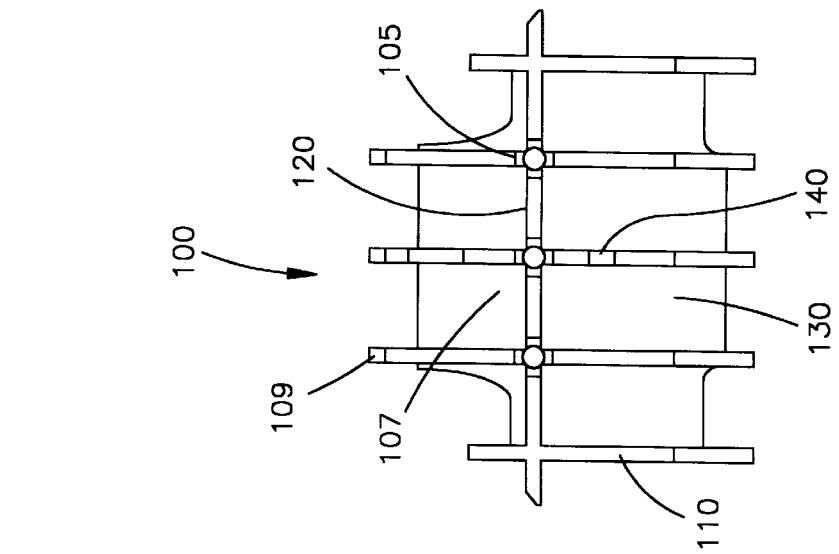
FIG. 7 is a view of a part of the assembly shown in FIG. 3.
Figure 6:
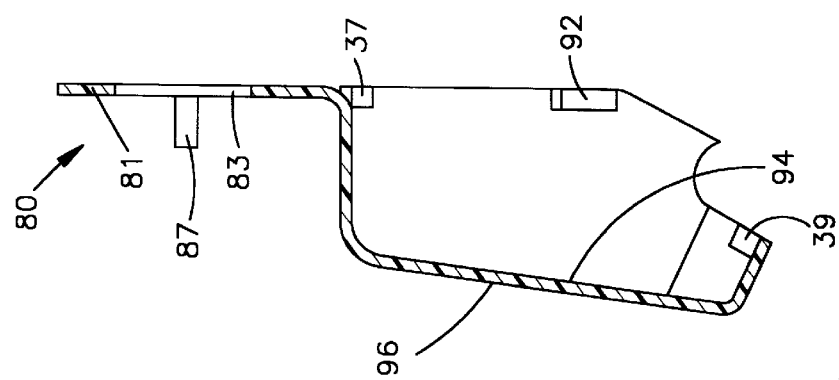
FIG. 6 is a sectional view taken along line 6—6 in FIG. 5.

The assembly 10 includes an energy absorbing structure 100 that is a part separate from the cover 30 and insertable between the webbing guide 30 and the cover 80. The energy absorbing structure 100 has a first set and a second set of resiliently crushable, plastic, planar ribs 110, 120, respectively, that extend from a base surface 130 (FIG. 7). The first and the second sets of ribs 110, 120 define a lattice structure with the ribs 110 of the first set extending perpendicular to the ribs 120 of the second set. Both sets of ribs 110, 120 extend away from the face portion 82 of the cover 80 in a direction parallel to the longitudinal axis of the fastener 70. The ribs 110, 120 thus intersect and extend transversely to each other.

Notches 105 at the intersection of the first and second sets of ribs 110, 120 separate the ribs 110, 120. The sets of ribs 110, 120 have a recessed portion 107 for receiving the head 76 of the mounting bolt 70.

The energy absorbing structure 100 is inserted between the webbing guide 30 and the cover 80 so that the base surface 130 of the energy absorbing structure 100 faces the inner surface 94 of the cover 30. The energy absorbing structure 100 snaps into the cover 80 by engaging ridges 37, 39 on the inner surface of the cover 30. The first set of ribs 110 include grooves 109 which receive the ridge 37 to secure the energy absorbing structure 100 to the cover 80. A projection 140 extends from one of the first set of ribs 110 and engages in an opening 141 in the webbing guide 30 for added security. As a result, the energy absorbing structure 100 is interlocked between the webbing guide 30 and the cover 80, as seen in FIG. 3 and FIG. 4. The energy absorbing structure 100 may be removed, however, and used in another cover.

In the event of a vehicle collision, particularly a side impact collision, the occupant of the seat 12 typically moves in the passenger compartment 13. The movement of the occupant can result in a portion of the occupant, such as the occupant's head 19, striking the resilient cover 80. When the cover 80 is struck, the cover 80 deflects inward and one or more of the first and second sets of ribs 110, 120 may be resiliently deformed and absorb the energy of the impact, as illustrated in FIG. 4. If the force acting on the cover is sufficiently high, portions of the first and second sets of ribs 110, 120 may fracture. The notches 105 enhance the flexibility of the energy absorbing structure 100. Further, the location of the first and second sets of ribs 110, 120 adjacent the bolt head 76 prevents any direct contact between the occupant's head 19 and the mounting bolt 70.

In accordance with the primary object of the invention, the resilient cover 80 provides the assembly with an HIC(d) factor of under 1000 determined in accordance with the United States Department of Transportation Federal Motor Vehicle Safety Standard No. 201. The HIC(d) factor of the cover 80 can be adjusted by changing the stiffness characteristics of the energy absorbing structure 100. Thus, the impact performance of the entire assembly 10 can be altered by replacing only the inserted energy absorbing structure 100 and keeping the other parts of the assembly 10 the same.

When the occupant's head 19 moves out of contact with the cover 80 and the resiliency of the cover 80 and the sets of ribs 110, 120 may return the cover 80 to its original position shown in FIG. 3. However, if portions of the ribs 110, 120 are fractured, the cover 80 will not return to its original position.

From the above description of the invention, those skilled in the art will perceive improvements, changes and modifications. Such improvements, changes and modifications within the skill of the art are intended to be covered by the appended claims.

What is claimed is:

1. An assembly for use in a vehicle, said assembly comprising:

a webbing guide for guiding movement of seat belt webbing in the vehicle;

a fastener for mounting said webbing guide in position in the vehicle, said fastener including a head portion and a longitudinal axis;

a resilient cover including a cover portion covering said head portion of said fastener and at least a portion of said webbing guide; and an energy absorbing structure insertable between said webbing guide and said resilient cover, said energy absorbing structure having a base wall with a base surface and an outer periphery, a plurality of parallel, spaced apart, planar first ribs extending from said base surface toward said webbing guide, and a plurality of spaced apart second ribs extending from said base surface toward said webbing guide, said first ribs and said second ribs being located within said outer periphery, at least one each of said first and second planar ribs extending transverse to each other and intersecting such that said one first planar rib extends toward one side of said one second planar rib and away from another side of said one second planar rib forming a cross that extends away from said base surface toward said webbing guide, said first and second planar ribs deforming to absorb energy of an impact to an outer surface portion of said resilient cover.

2. The assembly as defined in claim 1 further including a notch for separating at least one of said first ribs from at least one of said second ribs.

3. The assembly as defined in claim 1 wherein at least one of said first planar ribs includes a groove for attachment to said resilient cover, said groove engaging an inner surface of said resilient cover, said groove being disposed on a distal portion of said at least one first planar rib.

4. The assembly as defined in claim 1 wherein said energy absorbing structure includes a groove for connecting said energy absorbing structure to said resilient cover, said groove being disposed on a distal portion of at least one of the first planar ribs.

5. The assembly as defined in claim 1 wherein said energy absorbing structure is formed from a resilient plastic material.

6. The assembly as defined in claim 1 wherein said first and second ribs extend away from said resilient cover in a direction parallel to said longitudinal axis of said fastener.

7. The assembly as defined in claim 1 wherein at least one of said first ribs is perpendicular to at least one of said second ribs.

8. An assembly for use in a vehicle, said assembly comprising:

a webbing guide for guiding movement of seat belt webbing in the vehicle;

a fastener for mounting said webbing guide in position in the vehicle, said fastener including a head portion and a longitudinal axis;

a resilient cover including a cover portion covering said head portion of said fastener and at least a portion of said webbing guide; and an energy absorbing structure insertable between said webbing guide and said resilient cover, said energy absorbing structure having a base wall with a base surface and an outer periphery, a plurality of parallel, spaced apart, planar first ribs extending from said base surface toward said webbing guide, and a plurality of spaced apart second ribs extending from said base surface toward said webbing guide, said first ribs and said second ribs being located within said outer periphery, said energy absorbing structure being a part separate from said resilient cover and absorbing energy from an impact to an outer surface portion of said resilient cover.

9. The assembly as defined in claim 8 further including a webbing engagement cap bonded to said webbing guide, said webbing engagement cap facilitating movement of said seat belt webbing through said webbing guide.

10. The assembly as defined in claim 8 wherein said resilient cover includes two studs for insertion into corresponding holes in said webbing guide.

11. An assembly for use in a vehicle, said assembly comprising:

a webbing guide for guiding movement of seat belt webbing in the vehicle;

a resilient cover covering at least a portion of said webbing guide, said resilient cover having a projection for securing a first part of said resilient cover to said webbing guide; and an energy absorbing structure interconnecting a second part of said resilient cover and said webbing guide, said energy absorbing structure being a part separate from said resilient cover and said webbing guide, said energy absorbing structure having a base wall with a base surface and an outer periphery, a plurality of parallel, spaced apart, planar first ribs extending from said base surface toward said webbing guide, and a plurality of spaced apart second ribs extending from said base surface toward said webbing guide, said first ribs and said second ribs being located within said outer periphery.

12. The assembly as defined in claim 11 wherein said part includes a projection for interlocking said webbing guide and said resilient cover together.

13. The assembly as defined in claim 11 wherein said base wall of said energy absorbing structure has a parallel surface opposite said base surface, said parallel surface being secured adjacent an inner surface of said resilient cover when said part is snapped into said resilient cover, the entire area of said parallel surface being disposed adjacent said inner surface of said resilient cover.

14. An assembly for use in a vehicle, said assembly comprising:

a webbing guide for guiding movement of seat belt webbing in the vehicle;

a resilient cover covering at least a portion of said webbing guide, said resilient cover being connected to said webbing guide for pivoting movement; and an energy absorbing structure securing said webbing guide and said resilient cover against pivoting movement when said energy absorbing structure is inserted into interlocking engagement with said resilient cover and said webbing guide;

said energy absorbing structure being a part separate from said resilient cover and said webbing guide, said part having a base wall with a base surface, a plurality of parallel, spaced apart, planar first ribs extending from said base surface toward said webbing guide, and a plurality of spaced apart second ribs extending from said base surface toward said webbing guide.

15. The assembly as defined in claim 14 wherein said resilient cover includes a hinge for allowing pivoting movement between said resilient cover and said webbing guide.

16. An assembly for use in a vehicle, said assembly comprising:

a webbing guide for guiding movement of seat belt webbing in the vehicle;

a fastener for mounting said webbing guide in position in the vehicle, said fastener including a head portion and a longitudinal axis;

a resilient cover including a cover portion covering said head portion of said fastener and at least a portion of said webbing guide; and an energy absorbing structure insertable between said webbing guide and said resilient cover, said energy absorbing structure being a part separate from said resilient cover, said part having a base wall with a base surface and an outer periphery, a plurality of parallel, spaced apart, planar first ribs extending from said base surface toward said webbing guide, and a plurality of spaced apart second ribs extending from said base surface toward said webbing guide, said first ribs and said second ribs being located within said outer periphery, said part deforming to absorb energy from an impact to an outer surface portion of said resilient cover.

17. The assembly as defined in claim 16 wherein said energy absorbing structure includes a projection for engaging said webbing guide to secure said energy absorbing structure to said webbing guide.

18. The assembly as defined in claim 16 wherein said resilient cover includes a ridge for securing said energy absorbing structure to said resilient cover.

19. The assembly as defined in claim 16 wherein said webbing guide includes a first opening for attachment to the vehicle and a second opening for attachment of said resilient cover to said webbing guide, said second opening being separate from said first opening.

20. The assembly as defined in claim 16 wherein said first and second ribs are arranged in a pattern, said pattern defining a recessed portion for receiving said head portion of said fastener.

21. The assembly as defined in claim 16 wherein said first ribs and second ribs are arranged in a pattern, said pattern including at least one first rib intersecting at least one second rib such that said one each of said first and second ribs form a cross extending from said base surface toward said webbing guide, said pattern further including a notch located adjacent at least one other of said first ribs and one other of said second ribs, said notch allowing movement between said other first rib and said other second rib upon the occurrence of an impact to an outer surface of said resilient cover.

* * * * *